(12) United States Patent
Glesinger et al.

(10) Patent No.: US 8,479,425 B2
(45) Date of Patent: Jul. 9, 2013

(54) THREE-DIMENSIONAL DISPLAY POST

(75) Inventors: Gregory Allen Glesinger, Cambridge, WI (US); Bradley Christopher Hegg, Oregon, WI (US)

(73) Assignee: 3D Post, LLC, Cottage Grove, WI (US)

( * ) Notice: Subject to any disclaimer, the term of this patent is extended or adjusted under 35 U.S.C. 154(b) by 280 days.

(21) Appl. No.: 12/770,209

(22) Filed: Apr. 29, 2010

(65) Prior Publication Data

US 2011/0265362 A1 Nov. 3, 2011

(51) Int. Cl.
*G09F 15/02* (2006.01)

(52) U.S. Cl.
USPC ..................... 40/607.01; 52/288.1

(58) Field of Classification Search
USPC ........ 40/333, 607.01, 607.03; 404/9; D20/41; 52/33, 38, 287.1, 288.1, 255, 846
See application file for complete search history.

(56) References Cited

U.S. PATENT DOCUMENTS

| 4,742,630 | A | * | 5/1988 | Scumaci ......................... 40/333 |
| 5,974,712 | A | * | 11/1999 | Kallionpaa ..................... 40/612 |
| 6,099,203 | A | | 8/2000 | Landes |
| 6,250,003 | B1 | * | 6/2001 | Phinney ..................... 40/607.12 |
| D525,721 | S | | 7/2006 | Landes |
| 7,827,714 | B2 | * | 11/2010 | Howard et al. ................. 40/572 |
| 2007/0253208 | A1 | * | 11/2007 | Howard et al. ............... 362/431 |

* cited by examiner

*Primary Examiner* — Joanne Silbermann
(74) *Attorney, Agent, or Firm* — Cooper Legal Group LLC (57) ABSTRACT

The present technology provides an illustrative display post that includes a first side, a second side, and a third side. The third side of the display post has a concave portion extending along a length of the third side such that the concave portion is configured to receive a convex surface. The third side also has a first flat portion along a side of the concave portion and extending along the length of the third side and a second flat portion along an opposite side of the concave portion as the first flat portion and extending along the length of the third side.

20 Claims, 9 Drawing Sheets

THREE-DIMENSIONAL DISPLAY POST

BACKGROUND

The following description is provided to assist the understanding of the reader. None of the information provided or references cited is admitted to be prior art.

Various signs are commonly used for indicating property lines and displaying various warning messages. Example signs may include "no trespassing" signs, "posted" signs, "keep off" signs, "warning" signs, etc. Similar signs may also be used to warn of potential dangers such as high voltage, dogs, etc. Traditional signs were two-dimensional and could generally only be seen and read by someone standing directly in front of the sign.

Some three-dimensional sign posts have been developed to provide a wider viewing angle, in some cases permitting viewing angles of 180 degrees to 360 degrees. However, many of these three-dimensional sign posts have several disadvantages. For example, traditional three-dimensional sign posts generally have only planar sides. Such sign posts may be fine for attaching to completely flat surfaces, but the planar sides of such sign posts often result in an inadequate fit on a curved surface, such as a tree or round post.

In addition, many sign posts have inadequate connection points that do not allow for adequate fixation of the sign post to an object. Furthermore, many sign posts have openings that allow for bugs or animals to nest in them, creating a hazard for anyone that comes near the sign post or that attempts to move or adjust the sign post.

SUMMARY

The present technology provides an illustrative display post that includes a first side, a second side, and a third side. The third side of the display post has a concave portion extending along a length of the third side such that the concave portion is configured to receive a convex surface. The third side also has a first flat portion along a side of the concave portion and extending along the length of the third side and a second flat portion along an opposite side of the concave portion as the first flat portion and extending along the length of the third side.

The present technology further provides a hollow display post that comprises a one-piece housing substantially enclosing a volume of air. The one-piece housing includes a first planar display side, a second planar display side, and a third concave side. The third concave side includes a concave portion that extends along an entire length of the third side such that the concave portion is configured to receive a convex surface, a first flat portion that extends along at least a portion of the length of a first side of the concave portion, and a second flat portion that extends along at least a portion of the length of a second side of the concave portion that is opposite the first side of the concave portion. The one-piece housing further includes a top portion and a bottom portion that are fused to the first planar display side, the second planar display side, and the third concave side.

The present technology also provides a method of making a display post. The method comprises forming a hollow one-piece housing so that the housing includes a first planar display side, a second planar display side, and a third concave side. The third concave side includes a concave portion that extends along an entire length of the third side such that the concave portion is configured to receive a convex surface, a first flat portion that extends along at least a portion of the length of a first side of the concave portion, and a second flat portion that extends along at least a portion of the length of a second side of the concave portion that is opposite the first side of the concave portion. The housing further includes a top portion and a bottom portion that are fused to the first planar display side, the second planar display side, and the third concave side.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

There are a variety of disadvantages associated with traditional display posts. These include, but are not limited to, an inability of such display posts to be adequately affixed to both round and flat surfaces, a lack of adequate connection points on such display posts, and an inability of such posts to prevent the intrusion and nesting of bugs and animals. Described herein are illustrative three-dimensional display posts that provide a connection surface for affixing the post to either a round or flat surface. According to a representative embodiment, the display post also includes various connection points which offer a variety of connection options. According to another representative embodiment, the display post is hollow and substantially encloses a central volume of air in order to prevent the intrusion of bugs or animals inside the hollow, three-dimensional post.

Figure 1:
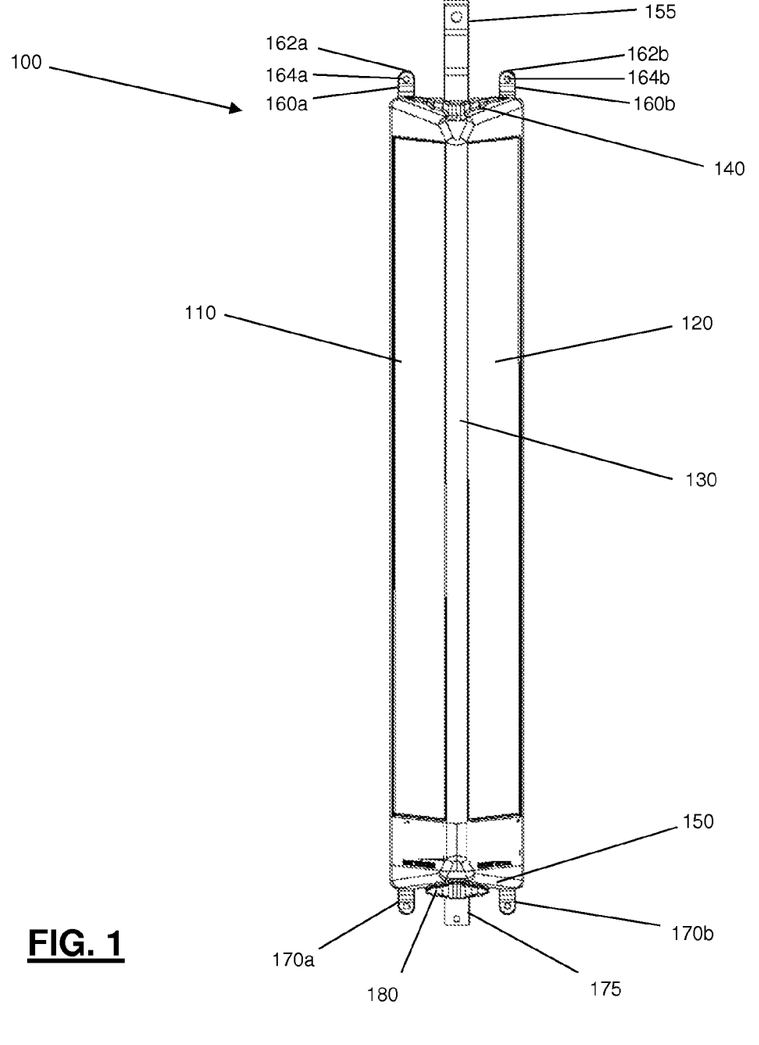
FIG. 1 depicts a front elevation view of a display post in accordance with an illustrative embodiment.

FIG. 1 depicts a front elevation view of a three-dimensional display post 100 in accordance with an illustrative embodiment. In an embodiment, display post 100 is hollow with an integral, one-piece outer plastic housing. The plastic housing may be formed from a high density polyethylene, regular polyethylene, or any other plastic known to those of skill in the art.

According to a representative embodiment, the housing of display post 100 substantially encloses a volume of air. For example, the housing of display post 100 may enclose the volume of air except for a very small opening as needed for various production processes such as a blow molding process, as described below. In an embodiment, the opening is a hole approximately 0.135" in diameter (although alternative embodiments have openings with different size diameters) in order to serve as an air release hole for the blow molding process. In alternative embodiments, additional small openings may be formed in the housing of display post 100 to enhance the blow molding process by allowing increased and more efficient cooling. In alternative embodiments, display post 100 may completely enclose a volume of air so that there are no openings to the hollow interior of display post 100. The substantially or completely enclosed one-piece housing has several advantages. The enclosed housing prevents the intrusion and nesting of animals, bugs, and birds. In addition, the enclosed housing provides increased strength and stability not found in display posts with open tops, bottoms, or sides.

Display post 100 includes a first side 110, a second side 120, and a third side 192 (not shown in FIG. 1). In an embodiment, first side 110 and second side 120 have substantially planar surfaces that may include a message or other indicia. In alternative embodiments, first side 110 and second side 120 may have non-planar surfaces or may have any desired shape as known to those of skill in the art.

Figure 2:
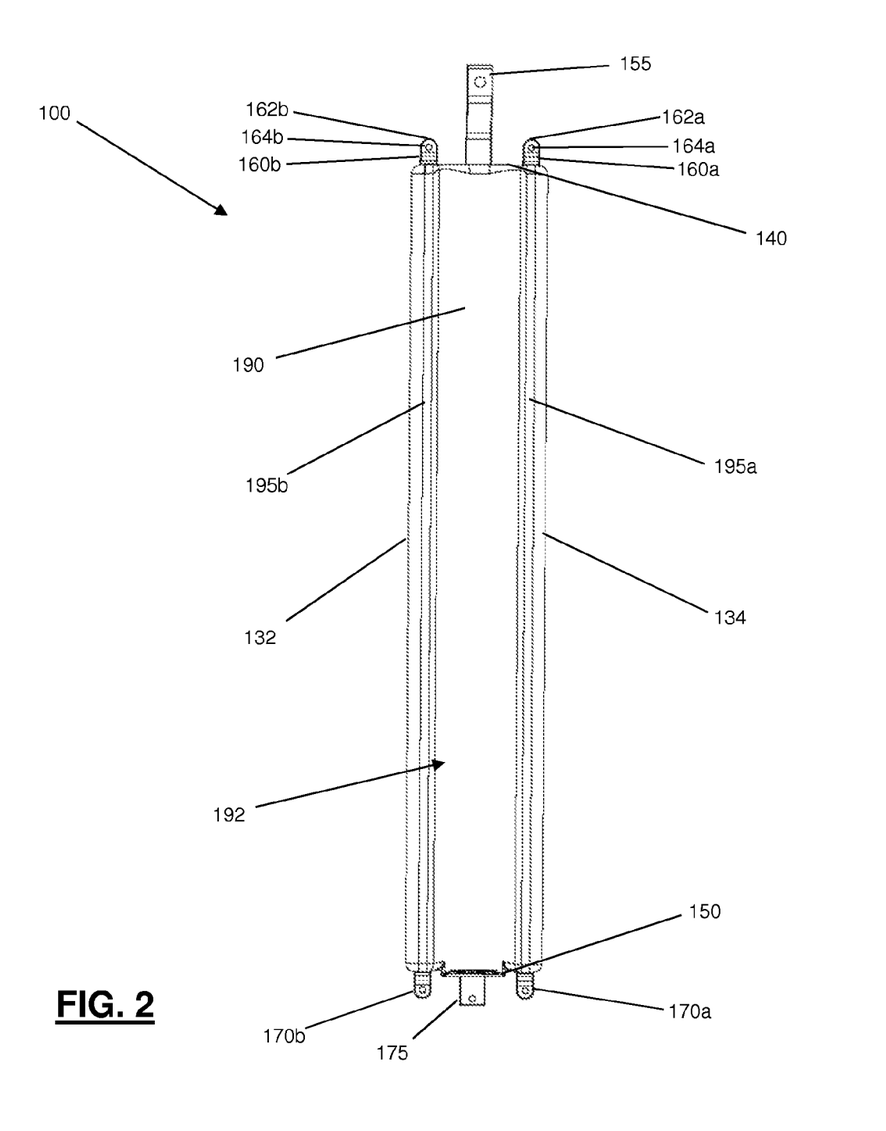
FIG. 2 depicts a back elevation view of a display post in accordance with an illustrative embodiment.

First side 110 is connected to second side 120 by a first radiused edge 130. In alternative embodiments, first side 110 and second side 120 may be connected at an edge that is not radiused, for example, at a distinct point. First side 110 and second side 120 are also connected to a top portion 140 and a bottom portion 150. Top portion 140 includes connection points 160a, 160b, and 155. In some embodiments, at least some of the connections points 160a, 160b, and 155 respectively comprise a tab extending from the top portion 140 and a hole or aperture extending through the tab. For example, in the illustrated embodiment, a first connection point 160a comprises a first tab 162a and a hole 164a extending though the first tab 162a, and a second connection point 160b comprises a second tab 162b and a hole 164b extending though the second tab 162b. In alternative embodiments, fewer or greater numbers of connection points may be utilized having similar or different configurations. In a representative embodiment, connection points 160a and 160b include small tabs that extend from top portion 140. Connection points 160a and 160b allow a user to easily attach display post 100 to an object with an appropriate fastener. A hole is formed through the small tab so that the fastener may be extended through the hole in order to affix display post 100 to the object. In an embodiment, connection points 160a and 160b are arranged on opposite sides of top portion 140 to afford even distribution of weight between each other upon affixing both connection points 160a and 160b to an object. In such an embodiment, connection points 160a and 160b may be located inline with flat surfaces 195a, 195b as depicted in FIG. 2. According to such an embodiment, connection points 160a and 160b may be used to securely fasten display post 100 to a surface of an object that contacts flat surfaces 195a, 195b.

Connection point 155 includes an elongated tab that extends from top portion 140. A hole is formed through the elongated tab so that a fastener may be extended through the hole to affix display post 100 to an object. In alternative embodiments, the elongated tab may extend from any location on top portion 140. In a representative embodiment, the elongated tab is attached to a front or center area of top portion 140 and is bent so that it extends toward the back of display post 100. As such, connection point 155 extends to a greater distance from top portion 140 than do connection points 160a and 160b and provides an alternative or additional connection option having a different location than connection points 160a and 160b. Connection point 155 thus allows a fastener to be affixed to an object at a different height than connection points 160a and 160b, thus increasing the number of possible locations on an object's surface to which display post 100 may be mounted. In another representative embodiment, the elongated tab is flexible to allow for fixation of connection point 155 to an inconsistent or varying surface. For example, a surface of an object to which display post 100 is affixed may have a planar portion along a majority of the back side of display post 100 and a non-planar portion that extends away from or toward display post 100 above top portion 140. A flexible elongated tab may be manipulated so as to accommodate either configuration of the object's surface.

Bottom portion 150 includes connection points 170a, 170b, and 175. In alternative embodiments, fewer or greater numbers of connection points may be utilized having similar or different configurations. In a representative embodiment, connection points 170a and 170b include tabs that extend from bottom portion 150. A hole is formed through the tabs so that a fastener may be extended through the hole to affix display post 100 to an object. In an embodiment, connection points 170a and 170b are arranged on opposite sides of bottom portion 150 in a similar manner as connection points 160a and 160b are attached to top portion 140. In alternative embodiments, connection points 170a and 170b may be positioned on different areas of bottom portion 150.

In an embodiment, connection point 175 includes a tab that extends from a central area of bottom portion 150 and is centered between connection points 170a and 170b. The tab includes a hole through which a fastener may be extend to affix display post 100 to an object. In an embodiment, connection point 175 extends from a cut out portion 180, which is described in more detail below.

Any manner of fastener known to those of skill in the art may be used to fasten display post 100 to an object via connection points 155, 160a, 160b, 170a, 170b, and 175. Example fasteners may include, but are not limited to, a zip tie, a screw, a nail, wire, string, rope, etc.

In a representative embodiment, bottom portion 150 includes cut out portion 180, although alternative embodiments of display post 100 may not include cut out portion 180 in bottom portion 150. Cut out portion 180 includes a projection that extends from bottom portion 150 and that is configured to be selectively removed from display post 100. In an embodiment, cut out portion 180 includes a recessed portion between the projection and bottom portion 150 which delineates the cutout portion from other parts of the bottom portion. The recessed portion is configured to allow easier removal of the projection. In an embodiment, the recessed portion includes a thinner width of material than the other parts of display post 150 such that the recessed portion may be more easily penetrated and cut. In an embodiment, the projection comprises plastic and the recessed portion comprises a thinner area of plastic that may be easily removed. In alternative embodiments, the recessed portion may comprises a same width of plastic as the rest of display post 100. A saw or other suitable device or cutting/removal tool may be applied to the recessed portion to cut around the plastic projection thereby separating the plastic projection from display post 100 and enabling removal of cut out portion 180. The recessed portion also provides an ideal guide for guiding the cutting or removal tool around cut out portion 180. Upon removal of cut out portion 180, display post 100 may be placed onto a post or other object by inserting the post or other object into the hole in display post 100 created by removing cut out portion 180.

In an embodiment, cut out portion 180 is shaped so as to securely receive a T-post. As such, cut out portion 180 is T-shaped in that it includes a narrower area 182 nearer the front of display post 100 and a wider area 184 nearer the rear of display post 100 as detailed in FIG. 3. In an alternative embodiment, the location of narrower area 182 and wider area 184 may be reversed. As such, narrower area 182 may be nearer the front of display post 100 and wider area 184 may be nearer the rear of display post 100. In a particular embodiment, narrower area 182 may comprise a width of approximately 0.5" or less and wider area 184 may have a width of approximately 1.75" (these sizes are approximate and may be modified as desired in order to receive any size post). According to such an embodiment, a standard T-post as known to those of skill in the art may be inserted into and will securely fit into the area vacated by removal of cut out portion 180 without the use of additional fasteners. In alternative embodiments, cut out portion 180 may have any desirable shape or size.

FIG. 2 depicts a back elevation view of display post 100 in accordance with an illustrative embodiment. As illustrated in FIG. 2, display post 100 includes a third side 192 that includes a concave portion 190 and flat portions 195a and 195b as further detailed in FIGS. 3 through 8. The inclusion of concave portion 190 and flat portions 195a and 195b on the third side allow display post 100 to be securely affixed to objects having both curved and flat surfaces. For example, if display post 100 is to be affixed to a tree having a round trunk, display post 100 may be affixed to the tree so that a convex portion of the round trunk of the tree is received in concave portion 190. Alternatively, if display post 100 is to be affixed to a planar wall, display post 100 may be affixed to the wall so that flat portions 195a and 195b securely contact the planar wall. Accordingly, the combined concave and flat portions of third side 192 allow for a secure fit of display post 100 onto both concave and flat surfaces.

In an embodiment, flat portion 195a of the third side is connected to first side 110 by a radiused edge 134 and flat portion 195b of the third side is connected to second side 120 by a radiused edge 132. Concave portion 190 is formed between flat portion 195a and flat portion 195b. In alternative embodiments, flat portions 195a and 195b may be connected to first and second sides 110 and 120, respectively, by edges that are not radiused.

FIG. 2 additionally illustrates connection points 155, 160a, and 160b which are located on top portion 140 and connection points 170a, 170b, and 175 which are located on bottom portion 150.

Figure 3:
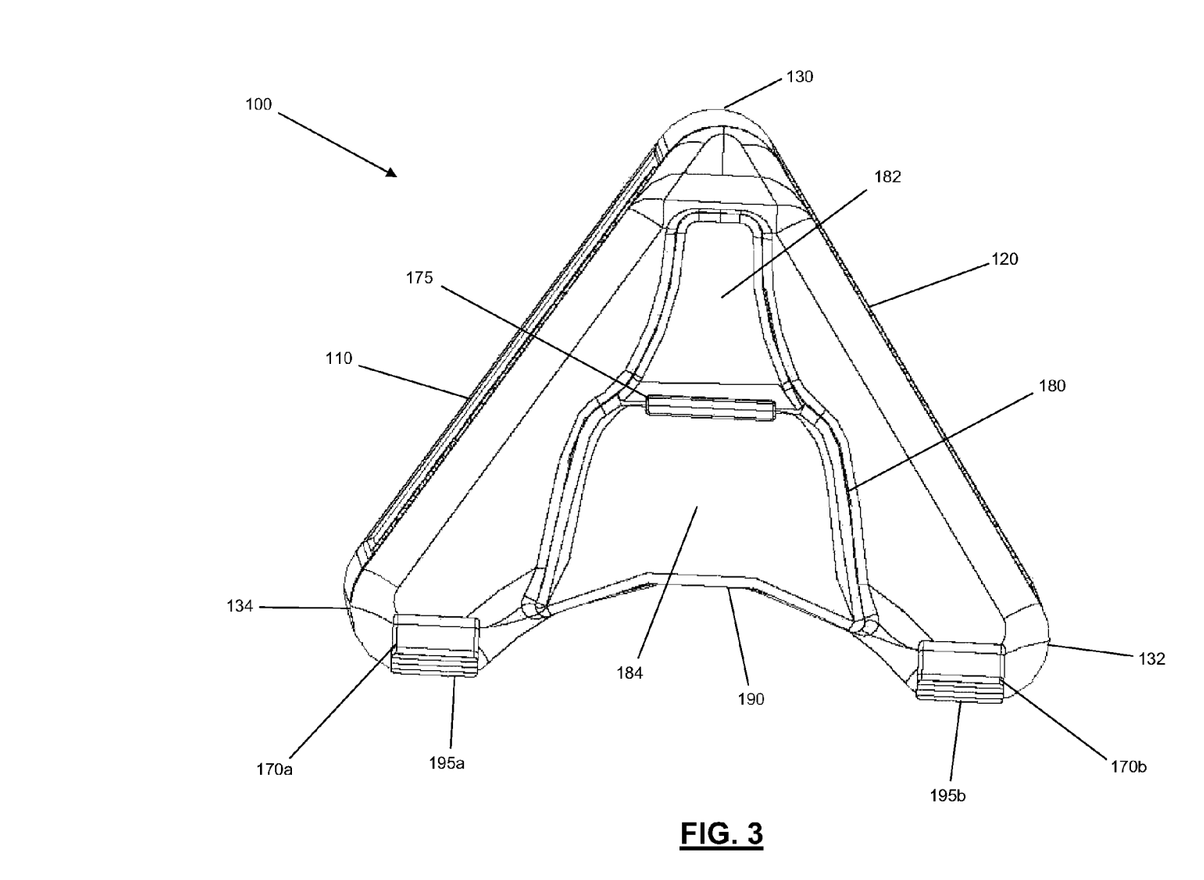
FIG. 3 depicts a bottom plan view of a display post in accordance with an illustrative embodiment.
Figure 4:
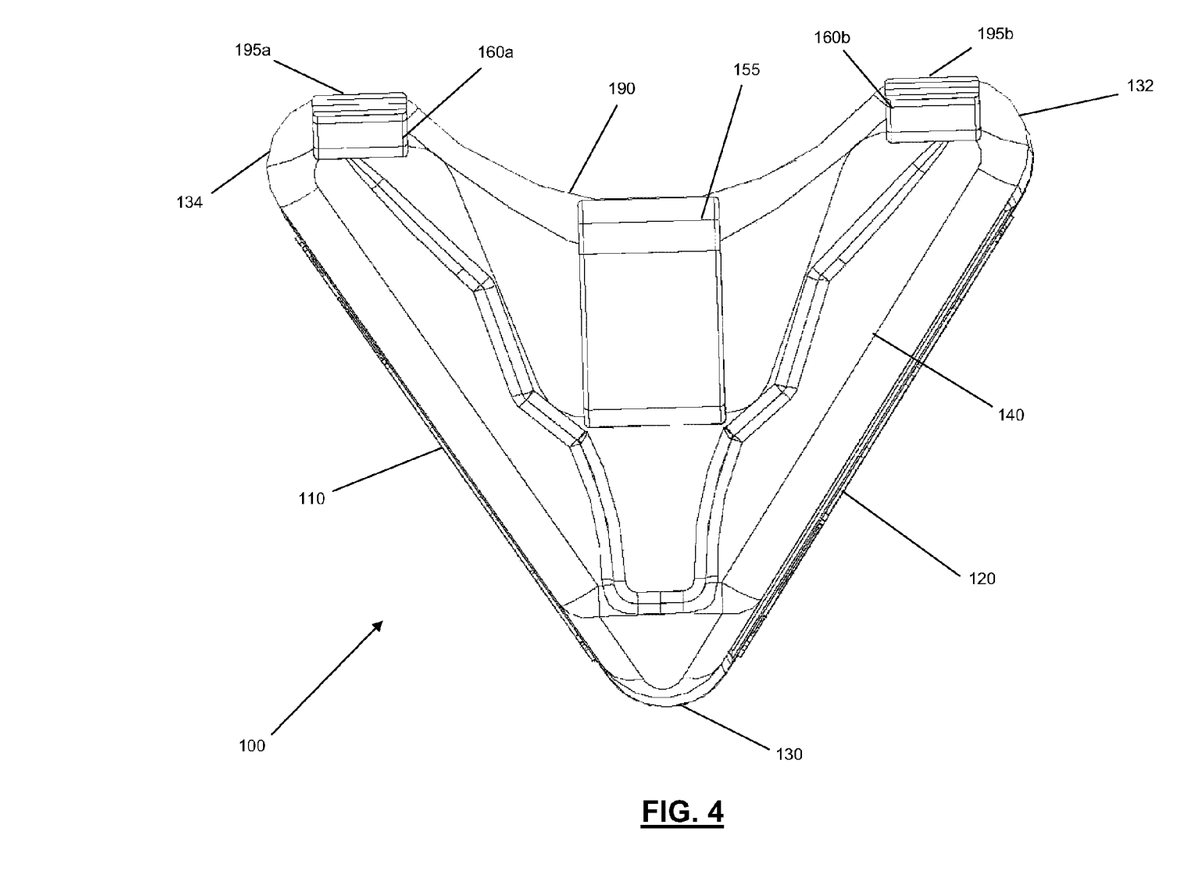
FIG. 4 depicts a top plan view of a display post in accordance with an illustrative embodiment.
Figure 5:
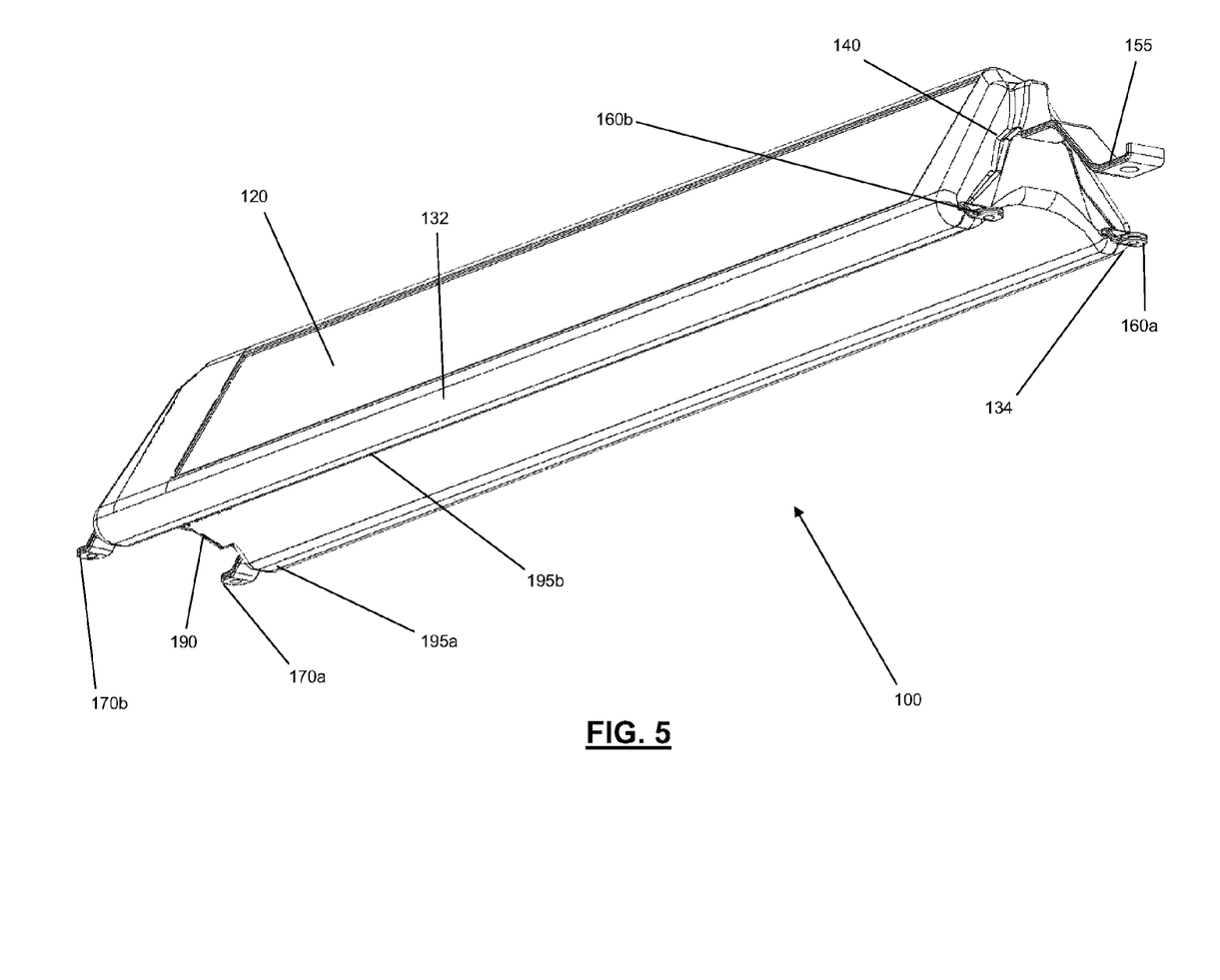
FIG. 5 depicts a first isometric view of a display post in accordance with an illustrative embodiment.
Figure 6:
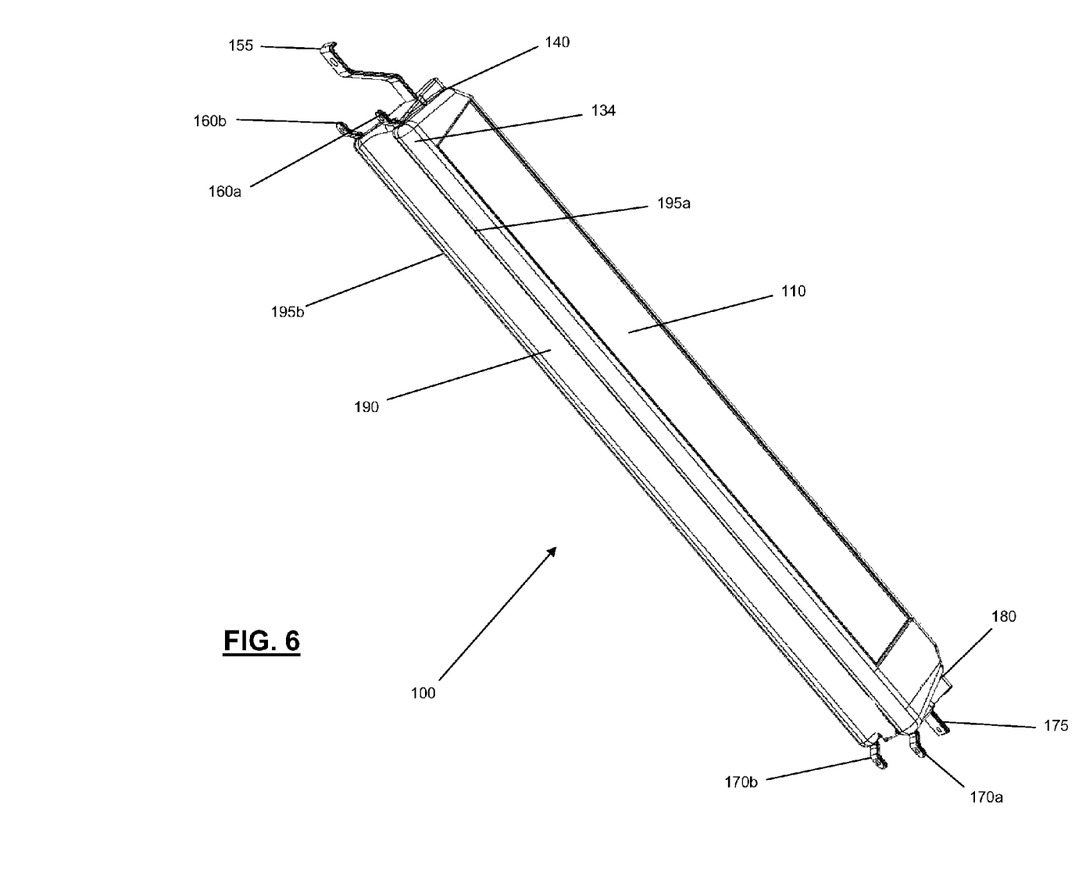
FIG. 6 depicts a second isometric view of a display post in accordance with an illustrative embodiment.
Figure 7:
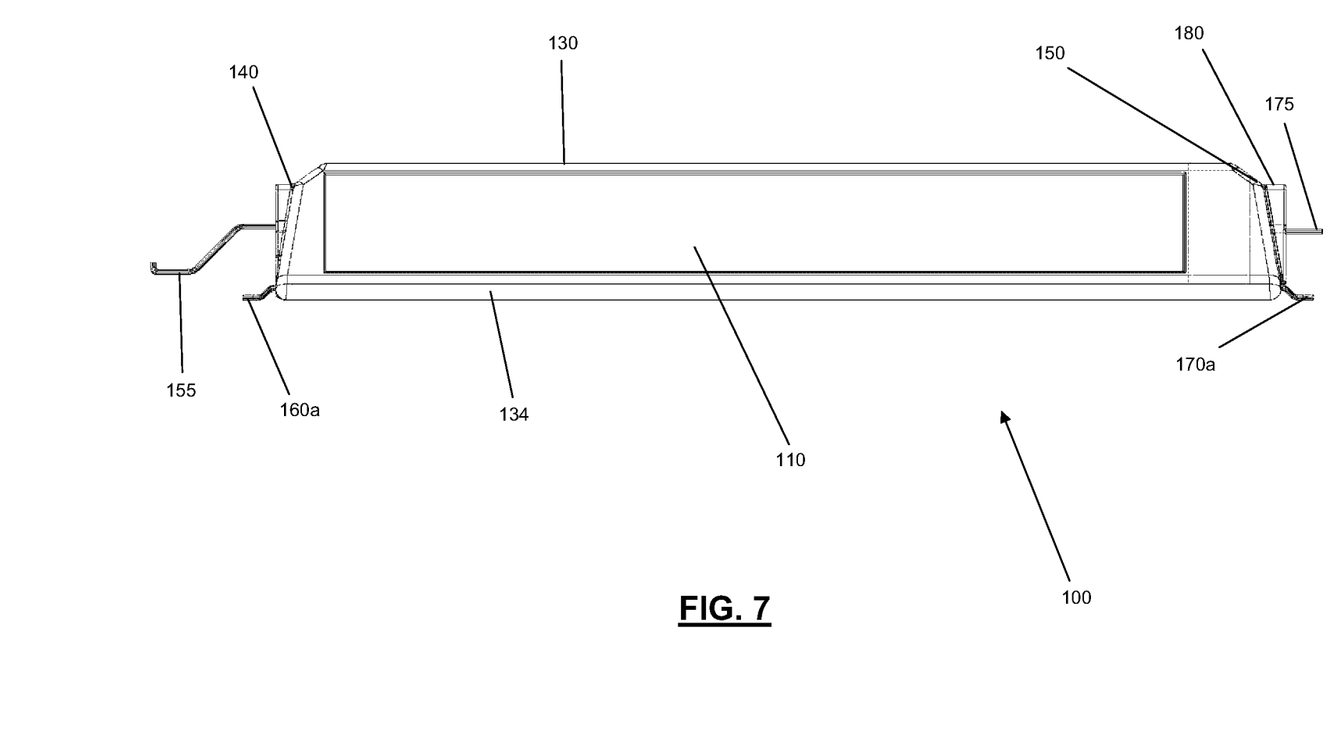
FIG. 7 depicts a left side elevation view of a display post in accordance with an illustrative embodiment.
Figure 8:
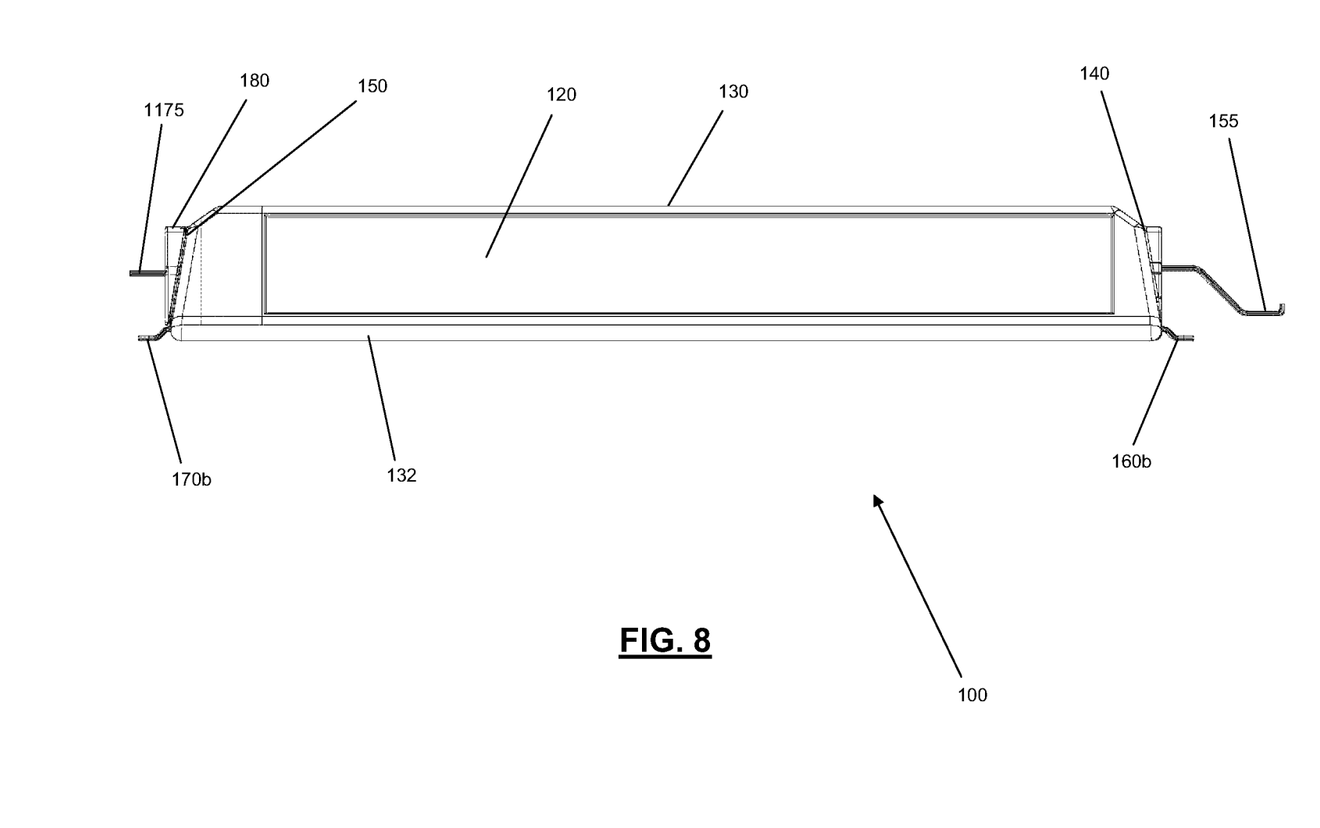
FIG. 8 depicts a right side elevation view of a display post in accordance with an illustrative embodiment.

FIGS. 3 through 8 illustrate display post 100 and its various components in accordance with several different views. For example, FIG. 3 depicts a bottom plan view of display post 100 in accordance with an illustrative embodiment. FIG. 4 depicts a top plan view of display post 100 in accordance with an illustrative embodiment. FIG. 5 depicts a first isometric view of display post 100 in accordance with an illustrative embodiment. FIG. 6 depicts a second isometric view of display post 100 in accordance with an illustrative embodiment. FIG. 7 depicts a left side elevation view of display post 100 in accordance with an illustrative embodiment, and FIG. 8 depicts a right side elevation view of display post 100 in accordance with an illustrative embodiment.

Figure 9:
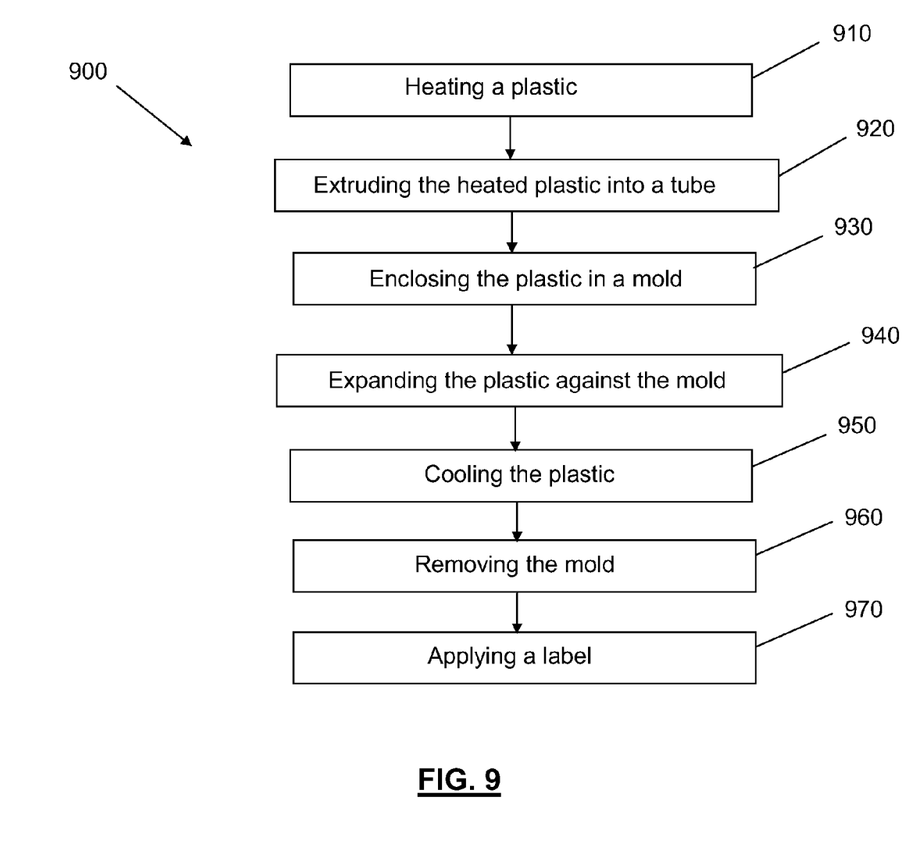
FIG. 9 depicts a blow molding process for manufacturing a display post in accordance with an illustrative embodiment.

In an embodiment, display post 100 is formed from a thermoplastic such as high-density polyethylene (HDPE) using a blow molding process. In alternative embodiments, the thermoplastic may comprise a normal polyethylene or any other thermoplastic known to those of skill in the art capable of being used in a blow molding process. In additional embodiments, a dye may be combined with the thermoplastic to produce display post 100 having a desired color or appearance. FIG. 9 depicts a representative blow molding process for manufacturing a display post in accordance with an illustrative embodiment. In a step 910, the thermoplastic resin is heated to a temperature of approximately 400° F. and melted. In a step 920, a parison is formed by extruding the heated thermoplastic into a tube or other shape that will adequately fit within a mold. The parison is then enclosed within a mold in a step 930. The mold has an inner surface having an inverse shape of the desired finished display post. In an embodiment, a mold is formed of two halves and the two mold halves are closed around the parison. In alternative embodiments, the mold may have a greater number of components or pieces according to alternative embodiments known to those of skill in the art.

A pressurized gas, such as air is introduced into the mold cavity to expand the parison against the inner surface of the mold in a step 940. The pressure is then held until the thermoplastic cools and hardens to form the appropriate shape, i.e., the display post, as dictated by the mold cavity. In a step 950, the thermoplastic/display post is then allowed to cool. In a step 960, the display post is removed from the mold cavity. In a step 970, a label is applied to the display post via a heat infusion process while the display post is cooling. According to such an embodiment, the label is applied to the display post when the display post is at a temperature of approximately 350° F., although the label may be applied at different temperatures so long as the label becomes sufficiently fused to the display post. The elevated temperature of the display post causes the label to become fused to the display post. The label may include various messages or indicia as desired by the designer of the display post.

In alternative embodiments, any process known to those of skill in the art may be used to apply a label to the display post. For example, a peel and stick label may be used, a label may be painted or drawn on the display post, etc.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A substantially triangular display post comprising:
a first side, a second side, and a third side,
the third side comprising:
a concave portion extending along a length of the third side such that the concave portion is configured to receive a convex surface;
a first flat portion along a side of the concave portion and extending along a first portion of the third side; and
a second flat portion along an opposite side of the concave portion as the first flat portion and extending along a second portion of the third side; and
a top portion and a bottom portion, the top portion and the bottom portion coupled to the first side, the second side, and the third side,
the to portion comprising a plurality of connection points configured to connect the display post to an object, the plurality of connection points comprising a first connection point arranged proximate to an end of the first flat portion and a second connection point arranged proximate to an end of the second flat portion, and wherein:
at least one of:
the first connection point comprises a first tab that extends from the top portion; or
the second connection point comprises a second tab that extends from the top portion, and
at least one of:
the first tab comprises a first hole extending through the first tab; or
the second tab comprises a second hole extending through the second tab.

2. The display post of claim 1, wherein the first side and the second side are substantially planar.

3. The display post of claim 1, comprising a hollow inner volume.

4. The display post of claim 1, wherein the top portion, the bottom portion, the first side, the second side, and the third side are integrally fused together.

5. The display post of claim 1, wherein the plurality of connection points comprises a third connection point, the first connection point extending a first distance from the to portion, the second connection point extending a second distance from the to portion, and the third connection point extending a third distance from the to portion, the third distance greater than at least one of the first distance or the second distance.

6. The display post of claim 1, the bottom portion comprising a plurality of connection points, a first connection point of the plurality of connection points of the bottom portion arranged proximate to a second end of the first flat portion and a second connection point of the plurality of connection points of the bottom portion arranged proximate to a second end of the second flat portion.

7. The display post of claim 1, the bottom portion comprising a selectively removable cutout portion, the cutout portion comprising a recessed portion configured to delineate the cutout portion from other parts of the bottom portion.

8. The display post of claim 7, wherein the cutout portion comprises a narrower portion and a wider portion such that an area vacated by removal of the cutout portion is configured to receive a T-post.

9. A substantially triangular display post comprising:
  a one-piece housing, comprising:
    a first planar display side;
    a second planar display side;
    a third concave side, comprising:
      a concave portion extending along a length of the third concave side such that the concave portion is configured to receive a convex surface;
      a first flat portion extending along at least a portion of a length of a first side of the concave portion; and
      a second flat portion extending along at least a portion of a length of a second side of the concave portion that is opposite the first side of the concave portion;
    a top portion physically coupled to the first planar display side, the second planar display side, and the third concave side, the top portion comprising at least a first connection point arranged proximate to an end of the first flat portion and a second connection point arranged proximate to an end of the second flat portion, and wherein:
      at least one of:
        the first connection point comprises a first tab that extends from the top portion; or
        the second connection point comprises a second tab that extends from the top portion, and at least one of:
        the first tab comprises a first hole extending through the first tab; or
        the second tab comprises a second hole extending through the second tab; and
    a bottom portion physically coupled to the first planar display side, the second planar display side, and the third concave side.

10. The display post of claim 9, comprising:
  plurality of connection points connected to the bottom portion.

11. The display post of claim 9, the bottom portion comprising a cutout portion that is configured for selective removal, the cutout portion comprising a recessed portion that extends along a perimeter of the cutout portion and is configured to delineate the cutout portion from other parts of the bottom portion.

12. The display post of claim 9, wherein the one-piece housing substantially encloses a volume of gas.

13. The display post of claim 9, wherein the length of the third concave side, the length of the first side of the concave portion, and the length of the second side of the concave portion are substantially equal.

14. The display post of claim 9, the length of the third concave side defined as a distance between the top portion and the bottom portion.

15. A three-sided display post, comprising:
  a first side, a second side, and a third side physically coupled together to form a substantially triangular-shaped structure,
    the third side comprising:
      a concave portion extending along a length of the third side and configured to receive a convex surface;
      a first flat portion adjacent the concave portion and extending along at least some of the length of the third side; and
      a second flat portion adjacent the concave portion and positioned diametrically opposite the first flat portion relative to the concave portion, the second flat portion extending along at least some of the length of the third side; and
  a top portion and a bottom portion, the top portion and the bottom portion coupled to the first side, the second side, and the third side,
    the top portion comprising at least a first connection point arranged proximate to an end of the first flat portion and a second connection point arranged proximate to an end of the second flat portion, and wherein:
      at least one of:
        the first connection point comprises a first tab that extends from the top portion; or
        the second connection point comprises a second tab that extends from the top portion, and at least one of:
        the first tab comprises a first hole extending through the first tab; or
        the second tab comprises a second hole extending through the second tab.

16. The display post of claim 15, the bottom portion comprising a selectively detachable cutout portion, which, when detached, provides for receiving a post configured to support the display post.

17. The display post of claim 16, wherein the cutout portion comprises a narrower portion and a wider portion such that an area vacated by removal of the cutout portion is configured to receive a T-post.

18. The display post of claim 12, wherein the top portion, the bottom portion, the first side, the second side, and the third side are integrally fused together.

19. The display post of claim 15, wherein the first side and the second side are substantially planar.

20. The display post of claim 15, comprising a substantially hollow interior volume.

* * * * *

UNITED STATES PATENT AND TRADEMARK OFFICE
CERTIFICATE OF CORRECTION

PATENT NO. : 8,479,425 B2
APPLICATION NO. : 12/770209
DATED : July 9, 2013
INVENTOR(S) : Gregory Allen Glesinger et al.

Page 1 of 1

It is certified that error appears in the above-identified patent and that said Letters Patent is hereby corrected as shown below:

In the Claims

Claim 1, Column 8, line 28, please delete "to" and insert therefor --...top...--;

Claim 5, Column 8, line 54, please delete "to" and insert therefor --...top...--;

Claim 10, Column 9, line 41, insert --a-- at the beginning of the line;

Claim 18, Column 10, line 45, please delete "12" and insert therefor --15--.

Signed and Sealed this
Eighth Day of April, 2014

Michelle K. Lee
*Deputy Director of the United States Patent and Trademark Office*